United States Patent Office 2,787,172
Patented Apr. 2, 1957

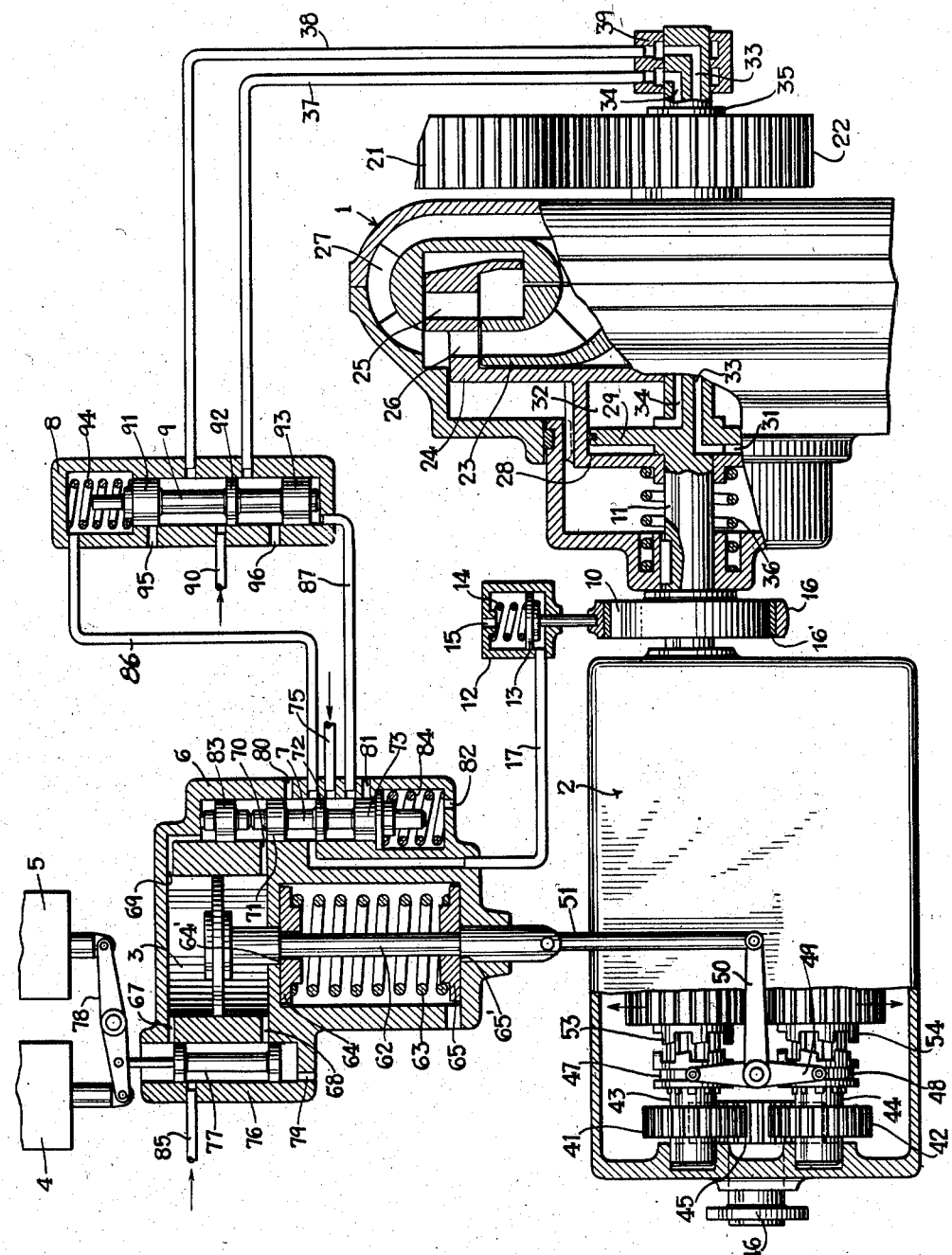

2,787,172

CONTROL MECHANISM FOR A POWER TRANSMISSION, INCLUDING A HYDRAULIC TORQUE CONVERTER AND A REVERSING GEAR

Hermann Gros, Friedrichshafen, Germany, assignor to Maybach-Motorenbau G. m. b. H., Friedrichshafen, Germany, a firm Application May 10, 1955, Serial No. 507,379

Claims priority, application Germany May 17, 1954

4 Claims. (Cl. 74—732)

The present invention relates to a power transmission, particularly for motor vehicles, the transmission including a hydraulic torque converter and, if desired, a tooth gear wheel speed changing gear. The power transmission according to the invention includes a reversing gear having claw clutches and a pressure fluid actuated control means controlling interruption of power transmission through the torque converter and controlling a brake for the turbine wheel of the torque converter and parts rotating with the turbine wheel or for one of the parts rotating with the turbine wheel when the claw clutches of the reversing gear are in neutral position. Interruption of the power transmission through the torque converter may be effected by moving the turbine wheel out of the circuit of the operating fluid of the torque converter. Alternatively, the torque converter may be provided with an adjustable blading or with an annular valve for interrupting the circuit of the operating fluid of the torque converter. If the turbine wheel is arranged to be axially displaced, it may be provided with a supplemental blading for producing a relatively small reverse torque, the supplemental blading being adapted to be moved into the circuit of the operating fluid instead of the normal ahead blading for quickly stopping the turbine wheel, particularly for speeding up the speed changing and reversing operations.

Power transmissions of the aforedescribed type are known. They afford quick interruption of the power transmission at any moment and braking of the turbine wheel as well as quick restoration of the power transmission after the reversing operation. The conventional arrangements, however, involve difficulties when starting the car which is equipped with a power transmission of the aforedescribed type because the brake is usually released too soon when the clutch defining the direction of movement of the car is engaged; this is particularly the case if the oil which serves as operating fluid for the transmission is still cold. Due to a premature rotation of the turbine wheel, the mating clutch halves of the claw clutches of the reversing gear may meet at too great a relative speed causing damage or destruction.

It is an object of the present invention to provide an automatic hydraulic power transmission avoiding the difficulties experienced with conventional hydraulic power transmissions by more exactly determining the moment at which the brake is released. With the arrangement according to the invention the brake is not released before the axially movable half of a clutch of the reversing gear abuts against its mating half or is at least very close to or within reach of the claws of the mating half. Release of the brake is made dependent on the stroke or movement of the control member for the reversing gear. For this purpose, the pressure of the control fluid for operating an actuator for the brake may be made dependent on the extent of the aforesaid stroke or movement, so that the actuator cannot release the brake before the operating member for the reversing gear has reached a position in which the movable half of one of the clutches of the reversing gear has been moved so far as to be within reach of the mating half.

For making the actuation of the brake dependent on a predetermined pressure of a control fluid actuating the clutches of the reversing gear, a control member is preferably interposed in the circuit of the control fluid for actuating the brake, the member being actuated in dependence on the position of a hydraulic piston for operating the clutches of the reversing gear. When the control member is in one of its extreme positions, the means for interrupting power transmission through the torque converter are actuated and the brake is applied. When the control member is in its other extreme position, which corresponds to the position of the hydraulic piston when one of the clutches of the reversing gear is about to be engaged, the brake is released and power transmission through the torque converter is not interrupted.

The means for interrupting power transmission through the torque converter is preferably provided with a spring which actuates the means for interrupting power transmission when the torque converter is standing still or when there is no pressure in the control fluid. For this purpose, the spring is arranged to counteract the control fluid when the means for interrupting power transmission are inactivated and the tension of the spring is made so small that its effect is smaller than that of the control fluid at the lowest operating speed of the torque converter.

The novel features which are considered characteristic of the invention are set forth with particularity in the appended claims. The invention itself however and additional objects and advantages thereof will best be understood from the following description of embodiments thereof, when read in conjunction with the accompanying drawing, the one figure of which is a diagrammatic, partly sectional illustration of a power transmission and reversing mechanism according to the invention.

Referring more particularly to the drawing, numeral 1 designates a torque converter, numeral 2 a reversing speed gear, 3 a hydraulic cylinder for actuating the reversing gear, numerals 4 and 5 designate solenoids, numeral 6 designates a housing attached to the cylinder 3 for accommodating a valve member 7, and numeral 8 designates a housing for a valve member 9. Numeral 10 designates a brake disc for a secondary shaft 11 of the torque converter 1. A brake 16 for the brake disc 10 which brake includes a brake lining 16' is actuated by a piston 13 in a hydraulic brake cylinder 12 having an air relief opening 15, the piston being actuated against the action of a spring 14 by a pressure fluid supplied through a conduit 17.

A pump wheel 23 of the torque converter 1 is driven by means of a spur gear wheel transmission 21, 22. The torque converter 1 is provided with a turbine wheel having ahead blading 25 and astern blading 26. The interior of the housing of the torque converter is provided with stationary guide blades 27. A cylinder 28 extends from the turbine wheel 24 coaxially of the latter, a piston 29 coaxially connected with the shaft 11 being movable in the cylinder 28. The space in the cylinder 28 to the left of the piston 29 is designated by numeral 31 and the space to the right of the piston is designated by numeral 32. Space 31 communicates with a bore 33 in the shaft 11 and space 32 communicates with a bore 34 in the shaft 11. The pump wheel 23 and the spur gear wheel 22 are mounted on a hollow primary shaft 35 of the torque converter. A spring 36 is interposed between the casing of the torque converter and the cylinder 28. Conduits 37 and 38 interconnect the housing 8 with a housing 39 surrounding the right end of the shaft 11 which extends through the hollow shaft 35. The interior of the housing 39 is provided with annular recesses individually communicating with the bores 33 and 34 and with the conduits 37 and 38.

The reversing gear 2 includes two shafts 43 and 44 on which gear wheels 41 and 42, respectively, are mounted. The teeth of the wheels 41 and 42 are in mesh with the teeth of a gear wheel 45 mounted on a driven shaft 46. Claw clutch halves 47 and 48 are individually axially movable but not rotatable on the splined shafts 43 and 44, respectively, and are connected by a two-arm lever 49. The latter can be swung by means of an arm 50, the free end of which is pivoted to a rod 51. Claw clutch halves 53 and 54 mate with the clutch halves 47, 48, respectively. The faces of the claws of one of the aforesaid clutches which faces face the mating clutch half are inclined in the conventional manner so that the claws of one clutch half reject the claws of the other clutch half, if the clutch halves move relative to each other in one direction and engage the claws and are adapted to move into the gaps of the other clutch half upon relative rotation of the clutch halves in the opposite direction.

The rod 51 is pivoted to a rod 62 extending from a piston 61 which is reciprocable in the cylinder 3. The rod 62 has two opposed shoulders 64' and 65' on which rest spring plates 64 and 65, respectively. A spring 63 is placed between the plates 64' and 65'. The cylinder 3 is provided at one end with pressure fluid channels 67 and 69 and at the other end with pressure fluid channels 68 and 70.

The valve member 7 in the housing 6 includes three coaxial and axially spaced piston portions 71, 72, and 73. Pressure fluid enters the cylindrical interior of the housing 6 through a supply conduit 75.

Attached to the hydraulic cylinder 3 is a cylinder 76 accommodating a piston valve member 77 which is pivoted to a two-arm lever 78 to the free ends of which the armatures of the solenoids 4 and 5 are pivoted. The cylinder 76 is provided with an air vent 79 and the housing 6 is provided with three vents 80, 81, and 82. A small piston 83 is provided above the member 7 in the cylindrical interior of the housing 6. A spring 84 acts on the lower end of the member 7.

A pressure fluid is supplied to the cylinder 76 through a conduit 85. The housing 8 is supplied with pressure fluid through a conduit 90. The housings 6 and 8 are interconnected by means of pressure fluid conduits 86 and 87. The valve member 9 is provided with three coaxial and axially spaced piston portions 91, 92, and 93. A spring 94 acts on the member 9. The housing 8 is provided with two air vents 95 and 96.

The drawing shows the movable parts of the system in the position in which they are when the system stands still, i. e. prior to starting of the car for which the system is provided. The turbine wheel 24 is held by the spring 36 in the position in which the ahead blading 25 is moved out of the path of the operating fluid and in which the astern blading 26 whose torque is small is in the path of the operating fluid. The brake 16 is applied by the spring 14 acting on the piston 13. The piston 61 in the cylinder 3 controlling the reversing gear is in its middle or neutral position in which the coupling halves 47 and 48 are disengaged from their mating halves by means of the linkage 62, 51, 50, 49. The valve member 77 is held in its lowermost position corresponding to the desired direction of movement of the car by means of the lever 78 which is controlled by the solenoids 4 and 5. The member 7 and the piston 83 are held in their uppermost position by means of the spring 84. The member 9 is held in its lowermost position by the spring 94.

The torque converter, the control mechanisms, and the conduits pertaining thereto may be already filled with a pressure fluid, for example oil, which, however, is as yet without pressure.

Upon starting of the engine pressure fluid is forced through conduit 85 into the cylinder 76 and therefrom through the channel 68 into the space in the cylinder 3 below the piston 61 so that the latter is moved upwardly from its middle position, compressing the spring 63 from below by means of the spring plate 65 and moving the clutch half 48 towards the corresponding clutch half 54 by means of the levers 49, 50, and the link 51. The oil pressure in the channel 70 and consequently the oil pressure acting on the pistons 83 and 71 is too low to compress the spring 84 and to move the member 7 downward. Since the space of the cylinder 12 below the piston 13 is connected with the atmosphere by the conduit 17 and the bore 80, the spring 14 holds the piston 13 in its lowermost position, applying the brake 10, 16, immobilizing the parts of the reversing gear connnected with shaft 11 as well as the turbine wheel while the piston 61 is moved.

When the valve member 7 is in the illustrated position, pressure fluid flows from the supply conduit 75 through the conduit 87 to the space below the valve member 9 moving the latter to its upper position against the action of the spring 94. When the member 9 is in its upper position, pressure fluid flows from the conduit 90 into the conduit 37, filling the space 32 of the cylinder 28. The pressure fluid in the space 32 acts in the same direction as the spring 36 so that the turbine wheel 24 remains in the position in which the astern blading 26 is in the circuit of the operating fluid of the torque converter.

When the piston 61 has traveled so far upwards that the front face of the claws of the coupling half 48 abut against the front faces of the claws of the mating coupling half 54, the pressure below the piston 61 and in the channel 70 increases. Due to the increased pressure on top of the piston portion 71 of the control member 7, the latter moves downward against the pressure of the spring 84, closing the vent 80 and connecting the pressure fluid supply conduit 75 with the conduits 17 and 86. The pressure fluid in the conduit 17 lifts the piston 13 thereby releasing the brake 10, 16.

The pressure fluid in the conduit 86 acts on top of the piston 91 of the control member 9 in the same direction as the spring 94 returning the member 9 to its lower position so that the cylinder space 31 of the torque converter 1 is supplied with pressure fluid from the conduit 38 through the channel 33 whereas the pressure fluid is removed from the chamber 32 through the channel 34, the conduit 37, and the port 96. The new distribution of pressure fluid in the chambers 31 and 32 causes movement of the turbine rotor to the left, removing the astern blading 26 from the circuit of the operating fluid of the converter and moving the ahead blading 25 into the circuit of the operating fluid. Since the brake 10, 16 was simultaneously released, the clutch half 54 can be rotated, the front faces of the claws of the clutch half 54 sliding along the mating faces of the clutch half 48 until the claws of the clutch half 48 drop into the gaps between the claws of the clutch half 54.

With the system according to the invention, the turbine wheel of the torque converter 1 and all parts rotating with the turbine wheel including the clutch halves 53 and 54 are prevented from moving until one of the clutches is ready to be engaged. It is therefore avoided that the clutches are engaged while their halves rotate at relatively high speeds.

When the direction of travel of the vehicle is changed, the latter is brought to a standstill. The valve member 77, which controls the operation of the reversing gear, is brought into the desired position, for example from the illustrated low position to the upper position by energizing one of the solenoids 4 or 5. Pressure fluid is released through the channel 68 and the bore 79 from the space below the piston 61 and the space above the piston 61 is filled with pressure fluid through the conduit 85 and the channel 67. Pressure fluid is also relieved from the space between the piston 83 and the control member 7 through the channels 70 and 58 and through the bore 79. Pressure fluid is supplied at the same time through the channel 69 to the top of the piston 83.

During the time the piston 61 moves downward and past the neutral or light running position, the pressure acting on the piston 83 is not enough to overcome the pressure of the spring 84. Therefore, the piston 83 and the control member 7 remain in the illustrated position. Not until the piston 61 has compressed the spring 63 through the spring plate 64 and has arrived at the position in which the clutch half 47 engages the clutch half 53, is the pressure above the piston 83 so great that it is moved with the control member 7 into the lower position, affording flow of pressure fluid from the conduit 75 into the conduit 86 and on top of the control member 9, forcing the latter into its lower position for conducting pressure fluid into the space 31 of the cylinder 28 so that the turbine wheel 24 is moved to the left and the ahead blading 25 is placed in the circuit of the operating medium of the torque converter. At the same time, pressure fluid from the conduit 75 is conducted through the conduit 17 into the space of the cylinder 12 which is below the piston 13. This causes release of the brake. The clutch 47, 53 can now be fully engaged.

If claw clutches are used whose claws have front faces which are inclined in two directions, release of the brake may simply be made dependent on the extent of movement of the member effecting actuation of the control mechanism, since, with claws having front faces inclined in two directions, the direction of the relative movement of the engaging claws is immaterial.

The brake is released upon an increase of the pressure of the control fluid in the conduit 17 which increase depends on the extent of movement of the member effecting actuation of the control mechanism. The brake actuating device may also be so arranged that it releases the brake upon a decrease of the pressure of the control fluid. The latter operation is not desired when clutches are used whose claw faces are inclined only in one direction.

What is claimed is:

1. A power transmission, particularly for motor vehicles, comprising a hydraulic torque converter including a turbine wheel, a reversing gear connected with said turbine wheel for operation thereby, means for interrupting power transmission through said torque converter, a brake for braking said turbine wheel, said reversing gear including claw clutches, each clutch having an axially movable clutch half and an axially unmovable clutch half, a control mechanism for selectively engaging one of said clutches, and fluid pressure actuated control means connected with said control mechanism and with said means for interrupting power transmission through said torque converter and connected with said brake, said fluid pressure actuated control means including means responsive to the movement of said control mechanism and retarding release of said brake means until said control mechanism is in the position immediately prior to engagement of one of said clutches.

2. A power transmission as defined in claim 1, in which said means for interrupting power transmission through said torque converter include a spring and an actuator adapted to be actuated by said spring and by the fluid pressure of said control means, the fluid pressure supplementing the pressure of said spring for interrupting power transmission through said torque converter and acting against said spring for effecting power transmission through said torque converter, the tension of said spring being less than the fluid pressure in said control means at minimum operating speed of the pumping part of said converter, said actuator, because of the action of said spring, actuating said means for interrupting power transmission through said torque converter when said converter is standing still and when there is no fluid pressure in said control means.

3. A power transmission, particularly for motor vehicles, comprising a hydraulic torque converter including a turbine wheel, a reversing gear connected with said turbine wheel for operation thereby, means for interrupting power transmission through said torque converter, a brake for braking said turbine wheel, a fluid pressure responsive actuator connected with said brake for actuating said brake, said reversing gear including claw clutches, each clutch having an axially movable clutch half and an axially unmovable clutch half, a control mechanism for selectively engaging one of said clutches, and fluid pressure actuated control means connected with said control mechanism and with said means for interrupting power transmission through said torque converter and connected with said actuator, said fluid pressure actuated control means including means responsive to the movement of said control mechanism and adapted to increase the fluid pressure in said actuator for releasing said brake at the moment when the axially movable half of one of said clutches abuts against the respective axially unmovable clutch half.

4. A power transmission, particularly for motor vehicles, comprising a hydraulic torque converter including a turbine wheel, a reversing gear connected with said turbine wheel for operation thereby, means for interrupting power transmission through said torque converter, a brake for braking said turbine wheel, a fluid pressure responsive actuator connected with said brake for actuating the latter, said reversing gear including claw clutches, each clutch having an axially movable clutch half and an axially unmovable clutch half, a control mechanism for selectively engaging said clutches, said control mechanism including a hydraulic cylinder, a piston reciprocable in said cylinder, and means connecting said piston and said clutches, fluid pressure actuated control means connected with said means for interrupting power transmission through said torque converter and connected with said actuator, and a control valve interposed in said fluid pressure actuated control means for controlling the flow of pressure fluid in said control means, said control valve being connected with said hydraulic cylinder for actuation by the fluid pressure in said cylinder, and being in one of its extreme positions when said clutches are disengaged, controlling the flow of pressure fluid in said control means for interrupting power transmission through said torque converter and for causing said actuator to apply said brake, said control valve being in its other extreme position when the axially movable half of one of said clutches abuts against the respective axially unmovable clutch half, controlling the flow of pressure fluid in said control means for transmitting power through said torque converter and for causing said actuator to release said brake.

References Cited in the file of this patent

UNITED STATES PATENTS

| Re. 19,428 | Salerni | Jan. 15, 1935 |
| 1,667,565 | Radcliffe | Apr. 24, 1928 |
| 1,900,118 | Lysholm | Mar. 7, 1933 |
| 2,084,219 | Salerni | June 15, 1937 |
| 2,333,253 | Jandasek | Nov. 2, 1943 |
| 2,352,483 | Jandasek | June 27, 1944 |
| 2,699,236 | Black | Jan. 11, 1955 |